United States Patent
Compains Pascualena et al.

(10) Patent No.: US 9,371,607 B2
(45) Date of Patent: Jun. 21, 2016

(54) METHOD FOR ADJUSTING A SPINNING SPEED OF A DRUM OF A HOUSEHOLD APPLIANCE FOR CARING FOR LAUNDRY ITEMS

(75) Inventors: Eduardo Compains Pascualena, Saragossa (ES); Rainer Jurmann, Falkensee (DE)

(73) Assignee: BSH HAUSGERÄTE GMBH, Munich (DE)

(*) Notice: Subject to any disclaimer, the term of this patent is extended or adjusted under 35 U.S.C. 154(b) by 544 days.

(21) Appl. No.: 13/576,174

(22) PCT Filed: Feb. 1, 2011

(86) PCT No.: PCT/EP2011/051386
§ 371 (c)(1), (2), (4) Date: Jul. 31, 2012

(87) PCT Pub. No.: WO2011/101237
PCT Pub. Date: Aug. 25, 2011

(65) Prior Publication Data
US 2012/0303163 A1    Nov. 29, 2012

(30) Foreign Application Priority Data
Feb. 17, 2010 (DE) .......................... 10 2010 002 048

(51) Int. Cl.
D06F 35/00 (2006.01)
D06F 37/20 (2006.01)
D06F 37/30 (2006.01)
G01H 1/00 (2006.01)

(52) U.S. Cl.
CPC ............ *D06F 35/007* (2013.01); *D06F 37/203* (2013.01); *D06F 37/304* (2013.01); *G01H 1/003* (2013.01)

(58) Field of Classification Search
None
See application file for complete search history.

(56) References Cited

U.S. PATENT DOCUMENTS 5,561,993 A * 10/1996 Elgersma ............... B04B 9/146
                                                  210/144
5,720,066 A *  2/1998 Kim ................................ 8/159
5,765,402 A *  6/1998 Ikeda et al. ................ 68/12.06
5,893,280 A *  4/1999 Honda et al. ............... 68/12.06

(Continued)

FOREIGN PATENT DOCUMENTS

EP     1882769 A1    1/2008
EP     1887124 A1    2/2008
WO  2004111324 A1   12/2004

OTHER PUBLICATIONS

International Search Report PCT/EP2011/051386.

(Continued)

*Primary Examiner* — Mohammad Ali
*Assistant Examiner* — Kelvin Booker
(74) *Attorney, Agent, or Firm* — Nixon & Vanderhye P.C.

(57) ABSTRACT

In a method for setting a spin speed of a drum of a household laundry care appliance, which is installed on a base, a gradient of an actual speed of the drum is detected during a spin operation and a determination is made as to whether the speed gradient is rising or falling. Vibrations caused by the household appliance during a spin operation as a function of the base in respect of frequency and/or amplitude are detected and compared with reference values. The spin speed is then changed as a function of the determined speed gradient if parameter values characterizing the vibrations deviate from the reference values.

18 Claims, 2 Drawing Sheets

(56) References Cited

U.S. PATENT DOCUMENTS

| | | | |
|---|---|---|---|
| 5,930,855 A | 8/1999 | Vande Haar et al. | |
| 6,023,854 A * | 2/2000 | Tsunomoto et al. | 34/531 |
| 6,029,300 A * | 2/2000 | Kawaguchi et al. | 8/159 |
| 6,292,966 B1 * | 9/2001 | Lim et al. | 8/158 |
| 6,460,381 B1 * | 10/2002 | Yoshida et al. | 68/12.04 |
| 6,477,867 B1 * | 11/2002 | Collecutt et al. | 68/12.06 |
| 6,510,715 B1 * | 1/2003 | Simsek | 68/12.06 |
| 7,039,976 B2 * | 5/2006 | Sears | 8/159 |
| 8,577,504 B1 * | 11/2013 | Morrison et al. | 700/275 |
| 8,621,893 B2 * | 1/2014 | Ko et al. | 68/12.06 |
| 8,893,341 B2 * | 11/2014 | Park et al. | 8/159 |
| 2004/0168480 A1 * | 9/2004 | Lorenz | A47L 15/4244 68/12.06 |
| 2005/0283919 A1 * | 12/2005 | Kim | D06F 35/007 8/158 |
| 2006/0010936 A1 * | 1/2006 | Weinmann | D06F 33/02 68/12.02 |
| 2006/0053838 A1 * | 3/2006 | Inuzuka | D06F 33/02 68/3 R |
| 2006/0053839 A1 * | 3/2006 | Matsushima | D06F 33/02 68/3 R |
| 2006/0185097 A1 * | 8/2006 | Weinmann et al. | 8/159 |
| 2007/0294838 A1 * | 12/2007 | Croxton | 8/158 |
| 2007/0294839 A1 | 12/2007 | Cho | |
| 2008/0178398 A1 * | 7/2008 | Darby et al. | 8/159 |
| 2009/0072684 A1 * | 3/2009 | Woo et al. | 312/228 |
| 2009/0241605 A1 * | 10/2009 | Moore | D06F 37/203 68/12.06 |
| 2010/0005598 A1 * | 1/2010 | Jung | 8/159 |
| 2010/0011515 A1 * | 1/2010 | Rhodes | D06F 33/02 8/159 |
| 2010/0175199 A1 * | 7/2010 | Kim et al. | 8/137 |
| 2010/0206869 A1 * | 8/2010 | Nelson et al. | 219/494 |
| 2010/0251487 A1 * | 10/2010 | Bolduan et al. | 8/159 |
| 2010/0251778 A1 * | 10/2010 | Jurmann et al. | 68/23.1 |
| 2012/0089258 A1 * | 4/2012 | Wong | D06F 35/007 700/279 |
| 2012/0151685 A1 * | 6/2012 | Jang | D06F 35/007 8/137 |
| 2012/0151686 A1 * | 6/2012 | Jang | D06F 33/02 8/137 |
| 2012/0151687 A1 * | 6/2012 | Jang | D06F 37/203 8/137 |
| 2012/0151688 A1 * | 6/2012 | Jang | D06F 37/203 8/137 |
| 2012/0151691 A1 * | 6/2012 | Jang | D06F 35/007 8/137 |
| 2012/0151695 A1 * | 6/2012 | Jang | D06F 33/02 8/137 |
| 2012/0154106 A1 * | 6/2012 | Jang | D06F 33/02 340/3.1 |
| 2013/0036772 A1 * | 2/2013 | Brueckner et al. | 68/12.18 |
| 2013/0036775 A1 * | 2/2013 | Brueckner et al. | 68/17 R |
| 2013/0042652 A1 * | 2/2013 | Brueckner et al. | 68/12.02 |
| 2014/0134402 A1 * | 5/2014 | Pallon | 428/157 |
| 2014/0244051 A1 * | 8/2014 | Rollins et al. | 700/282 |

OTHER PUBLICATIONS

National Search Report DE 10 2010 002 048.6.

* cited by examiner

METHOD FOR ADJUSTING A SPINNING SPEED OF A DRUM OF A HOUSEHOLD APPLIANCE FOR CARING FOR LAUNDRY ITEMS

BACKGROUND OF THE INVENTION

The invention relates to a method for setting a spin speed of a drum of a household laundry care appliance, for example a washing machine, a tumble dryer or a washer/dryer.

With such household appliances during a care process the drum is made to rotate and a spin operation is thus performed. Such spinning generally takes place at variable speed. Generally such household appliances are installed on a base, with different conditions occurring as a function of said base in respect of oscillation transmission or oscillation damping. If during such a spin operation the speed is varied and changed over a relatively broad spectrum, states can occur in which the household appliance is subject to relatively significant vibration. This can result in function impairment, with a disadvantageous effect on the care process. Also such vibrations increase the wear on components of the household appliance.

BRIEF SUMMARY OF THE INVENTION

The object of the present invention is to create a method, wherein the setting of the spin speed of a drum of a household appliance is improved by allowing such vibrations to be at least significantly reduced.

This object is achieved by a method having the features as claimed in claim 1.

With an inventive method for setting a spin speed of a drum of a household laundry care appliance said household appliance is installed on a base. During a spin operation of the household appliance a gradient of the current speed (actual speed) of the drum is detected and it is determined whether the speed gradient is rising or falling, in other words whether the speed gradient is greater than or equal to zero (rising) or less than zero (falling). If the household appliance vibrates in a manner that is a function of the base in respect of frequency and/or amplitude, such vibration is also detected during the spin operation and compared with reference values. The spin speed is changed so as to reduce vibration as a function of the determined speed gradient, the comparison of the vibration with reference values and if the parameter values characterizing the vibrations deviate from the reference values. Such parameter values are for example a frequency and/or amplitude of an acceleration, oscillation speed or oscillation displacement detected at a component of the household appliance. The inventive method therefore allows a situation-specific response to unwanted vibrations, regardless of the base on which the household appliance is installed, and the spin speed to be changed individually during the current spin operation. A generally predefined program is therefore no longer run through, which, not being tailored to the installation conditions of the household appliance, results in significant vibrations in some instances, but instead there is in practice an intelligent response to the current situation developing during a spin operation. It is thus possible to respond in a situation-specific manner to vibrations thus occurring in a situation-specific and individual manner for any installation site having individuality in respect of materials and oscillation characteristics, preventing such vibrations by changing the spin speed in an intelligent manner.

When household laundry care appliances of this type, for example front-loading washing machines, are installed on wooden floors, significant vibration is generally produced with conventional procedures, since such wooden floors are relatively soft. Vibrations in the resonant frequency of the floor produce such strong vibrations that the household appliance is subject to a high level of wear. The inventive method allows the occurrence of such vibrations to be at least significantly reduced in the case of such specific base conditions as relatively soft wooden floors. It is therefore also possible, when the household appliance is installed with such specific base conditions, for it to continue to operate during the spin operation with little vibration even if the spin operation and therefore the spin speed reaches a critical speed range.

The spin speed is preferably changed as a function of the parameter values characterizing the specific vibration to reduce the vibration. The spin speed is therefore changed in an appropriate manner for the situation as a function of the speed conditions in which the vibration occurs and in particular the extent to which said vibration occurs.

The vibration is preferably detected by an acceleration sensor. This is a relatively simple and uncomplicated embodiment, which is also configured to be economical but still extremely reliable. The characterizing parameter values of the vibration are preferably detected on the housing of the household appliance or on a component connected rigidly to the housing of the household appliance, for example a foot of the household appliance.

The determination as to whether the speed gradient during spinning is currently rising or falling preferably takes place when a reference amplitude is exceeded by a detected specific amplitude of a detected vibration during a spin operation.

When the speed gradient rises, a dwell speed is preferably determined and set or maintained for a predefinable time period, with the dwell speed being determined from the actual speed minus a predefined delta speed. After the end of this predefinable time period it is preferably determined whether a target speed is greater than the dwell speed plus a predefined resonance range speed. In particular the spin operation is continued at least for a while at this target speed, until the spin operation can be brought to an end without further undesirably high vibration or until a further undesirably high vibration is detected before the end of the spin operation, if the target speed is greater than the dwell speed plus the predefined resonance range speed. The dwell speed is preferably maintained for a further predefinable time period, if the target speed is lower than the dwell speed plus the resonance range speed, it being checked once again after this further time period whether the target speed is then greater than the dwell speed plus the resonance range speed.

If on the other hand a fall in the speed gradient is detected, in the case of such a falling speed gradient a second dwell speed is determined and this dwell speed is then set or maintained for a predefinable time period, this second dwell speed being determined from the actual speed plus a predefined delta speed.

After the end of the time period it is preferably determined whether a target speed is lower than the second dwell speed plus a predefined resonance range speed. In particular the spin operation is continued for a while at this target speed until the spin operation can be brought to an end without further undesirably high vibration or until a further undesirably high vibration is detected before the end of the spin operation, if the target speed is lower than the second dwell speed minus the resonance range speed. The second dwell speed is preferably maintained for a further predefinable time period, if the target speed is greater than the second dwell speed minus the resonance range speed, it being checked once again after this further time period whether the target speed is then lower than the second dwell speed minus the resonance range speed.

The spin speed with such a gradient is preferably changed in the event of detected undesirably high vibrations so that a speed band of a resonance range of the vibrations is passed through in a very short time. Provision can be made in particular for a speed band, which covers an interval of fewer than or equal to 300 revolutions between an upper and lower limit value to be passed through within a time period shorter than 5 seconds, in particular shorter than 3 seconds.

Measures can therefore be taken in a manner that is specific to the base and therefore a function of the material and conditions and therefore a function of the structure of the base in response to vibrations of the household appliance that are a specific function of said base, to adjust the spin speed so that the vibrations abate as quickly as possible again and in particular completely disappear.

The delta speed and resonance range speed are preferably determined beforehand in experiments and defined and stored specifically for the household appliance or type. With the inventive method or an advantageous embodiment thereof it is possible to operate a household appliance with a drum rotating in this manner on any base. The machine can in particular use information from an acceleration sensor to identify where the critical speeds lie, therefore where vibrations can occur in an uncontrolled manner, it then being possible to avoid such spin speeds independently and automatically or to bridge and pass through them quickly.

BRIEF DESCRIPTION OF THE DRAWINGS

An exemplary embodiment of the invention is described in more detail below with reference to schematic drawings, in which.

DETAILED DESCRIPTION OF EXEMPLARY EMBODIMENTS OF THE PRESENT INVENTION

Figure 1:
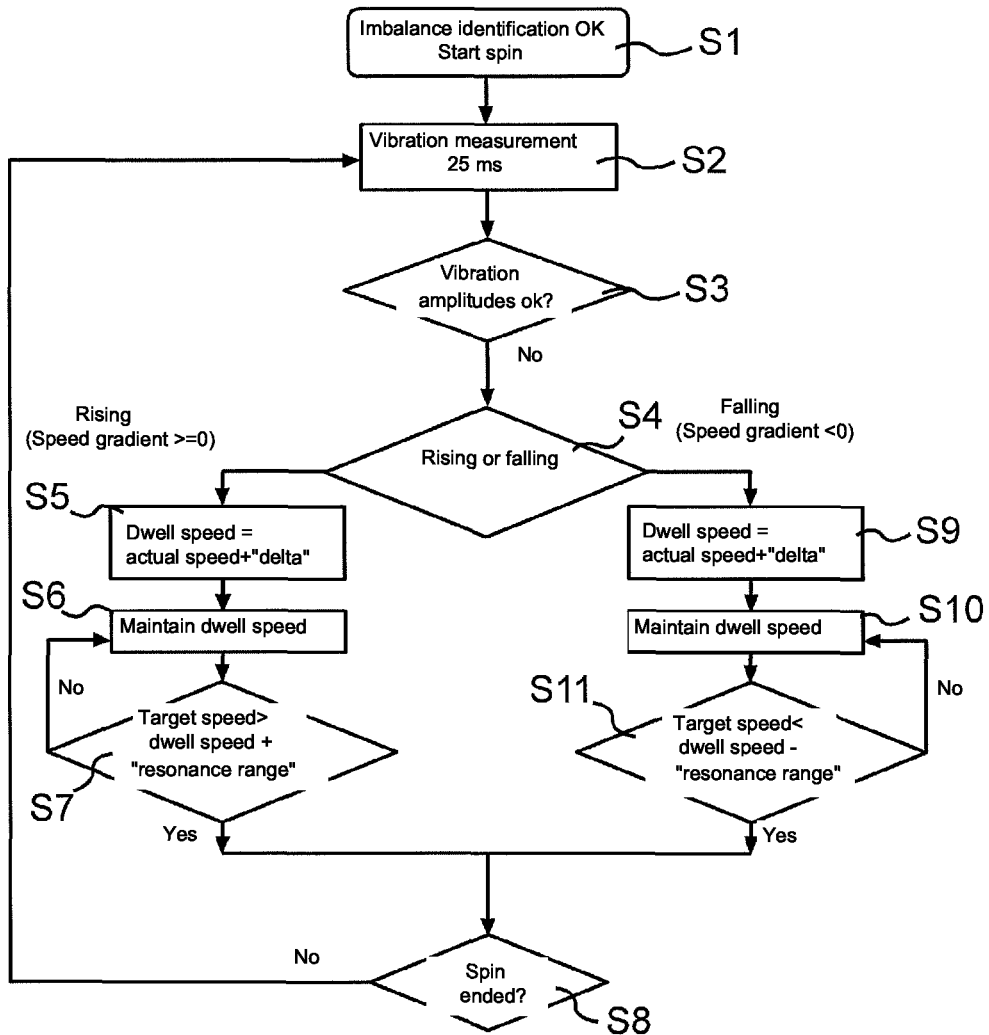
FIG. 1 shows a flow diagram of an exemplary embodiment of an inventive method.

The method according to FIG. 1 is performed and monitored by a control unit in a household laundry care appliance. The household appliance is configured in particular as a washing machine, having a front opening for loading. The household appliance is installed on a wooden floor.

When the household appliance is operating during a spin operation and therefore during rotation of the drum of the household appliance the imbalance of the drum is also identified by way of an imbalance identification facility. At the start of the spin operation it is checked whether the imbalance identification facility is activated and ready for operation. If so, according to a step S1 the spin operation is started. A vibration measurement is then performed according to a step S2. Provision is preferably made here for such a vibration measurement to take place at certain time intervals, for example every 25 ms.

It is detected in the process whether or not the vibrations are within an acceptable range. In the exemplary embodiment this is detected by measuring the amplitudes of measured vibrations and comparing them with reference values. This is carried out according to a step S3. If the measured amplitudes of a vibration exceed a reference amplitude, in a further step S4 it is checked whether there is a rise or fall. In the case of a rise, it is checked whether the speed gradient remains greater than or equal to zero, a fall being characterized in that the speed gradient is or becomes smaller than zero. If it is determined that a rise is taking place according to step S4, in a step S5 a dwell speed is set, which results from an actual speed minus a delta speed. This dwell speed is then set and maintained according to a step S6 for a predefinable time period. In a step S7 it is then checked whether a target speed is greater than the dwell speed plus a predefinable resonance range speed. If not, the method returns to step S6 and the dwell speed is maintained again for a predefinable time period. This loop between steps S6 and S7 is performed until it is determined in step S7 that the target speed is greater than the dwell speed plus the resonance range speed. The spin operation is then continued, with it then being checked in a step S8 whether the spin operation can be brought to an end without further undesirably high vibrations. If the spin operation has not yet ended, the method returns to step S2 and a vibration measurement is performed at the abovementioned time intervals. The loop is then performed between steps S2 to S8 here too, until the spin operation ends.

If a fall is detected in step S4 rather than a rise, in a step S9 a dwell time is set, which is the sum of the actual speed plus the delta speed. This dwell speed is then set according to a step S10 for a predefinable time period. After this time period or even during this time period it is checked in a step S11 whether the target speed is lower than this dwell speed minus the resonance range speed, If not, the method returns to step S10 in a loop and steps S10 and S11 are repeated until said target speed is lower than the dwell speed minus the resonance range speed. Once this happens, the method moves on again to step S8 and it is checked whether the spin operation has ended. If not, the method returns again to step S2 and the steps following step S2 are performed again.

Figure 2:
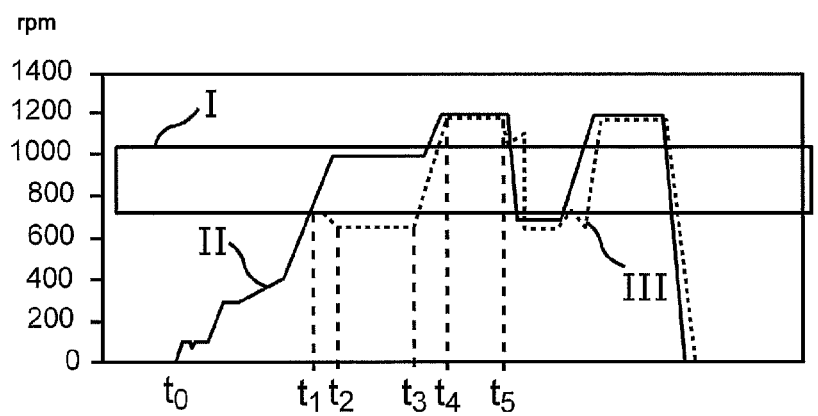
FIG. 2 shows a schematic diagram of spin speed according to a first embodiment.

FIG. 2 shows a schematic diagram, in which the spin speed is shown as a function of time. The resonant band I or the frequency band containing the critical frequencies at which unwanted vibrations are produced due to the coupling of the household appliance to the base results here roughly in a range between 750 revolutions per minute and 1050 revolutions per minute. This band I is merely an example. The range in band I therefore represents the resonance range.

The curve pattern II shown by the continuous line indicates the normal conventional spin operation.

In FIG. 2 the invention allows the base-specific vibrations occurring to an undesirably major degree to be detected and, when the spin speed is reached or when the spin speed enters the band I at time t1, a response is produced and the spin speed is reduced until time t2, this then being maintained until time t3. At time t3 the spin speed is increased relatively significantly within the shortest possible time until time t4, so that it is possible to pass through the band I relatively quickly. At time t4 the spin speed has an end speed, which is above band I. This speed is correspondingly maintained for a certain time period until time t5. Then according to the broken line III, which shows the specifically and automatically changed speed line according to an embodiment of the invention, the speed is changed once again as a function of the spin pattern so that when the spin speed enters the critical band I, automatic measures are taken to keep the spin speed out of it or to pass through said band I as quickly as possible.

Figure 3:
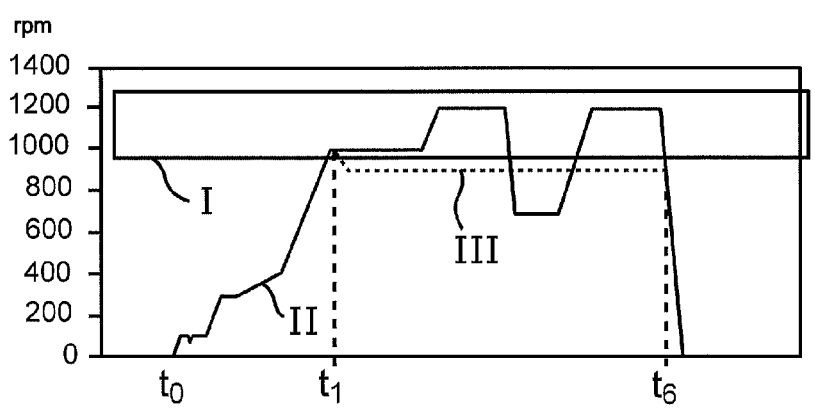
FIG. 3 shows a schematic diagram of spin speed according to a further exemplary embodiment.

FIG. 3 shows a further exemplary embodiment of such a spin speed variation, with band I lying at higher speeds with this embodiment. In the embodiment shown provision is made for the spin speed to be changed so that the spin speed is always lower than the lower threshold of the band I. This is shown by the broken line III. In contrast the line II shows the conventional pattern, with the lines II and III running in an identical manner from time t0 to time t1, as is also the case from time t6.

The invention claimed is:

1. A method for setting a spin speed of a drum of a household laundry care appliance, which is installed on a base material, said method comprising:
    detecting vibrations caused by the household appliance daring a spin operation that exceed a parameter value, the parameter value being set as a function of the base material;
    detecting during a spin operation a gradient of an actual speed of the drum, including acceleration and deceleration;
    determining whether the detected speed gradient is in a state of rising or falling;
    comparing the detected vibrations with reference values, the reference values being set as a function of the base material; and
    changing the spin speed as a function of the determined state of the detected speed gradient if parameter values characterizing the vibrations deviate by a predetermined amount from the reference values;
    wherein if the gradient is determined to be rising, the spin speed is changed according to a first process and if the gradient is determined to be falling, the spin speed is changed according to a second process which is different from the first process.

2. The method of claim 1, wherein the spin speed is changed as a function of the parameter values characterizing a specific vibration to reduce the vibration.

3. The method of claim 1, wherein the vibrations are detected by an acceleration sensor.

4. The method of claim 1, wherein the determining step is executed when a reference amplitude is exceeded by a detected specific amplitude of a detected vibration during a spin operation.

5. The method of claim 4, wherein the determining step includes the step of determining a first dwell speed in the presence of a rising speed gradient, and setting the first dwell speed for a predefinable time period, which is determined from the actual speed minus a predefined delta speed.

6. The method of claim 5, further comprising the step of determining, after elapse of the time period, whether a target speed is greater than the first dwell speed plus a predefined resonance range speed.

7. The method of claim 6, further comprising the step of continuing the spin operation at least for a while at the target speed, until the spin operation can be brought to an end without further undesirably high vibration or until a further undesirably high vibration is detected before the end of the spin operation, if the target speed is greater.

8. The method of claim 6, further comprising the steps of maintaining the first dwell speed for a further predefinable time period, if the target speed is lower than the first dwell speed plus the resonance range speed, and checking, after elapse of the further time period, whether the target speed is greater than the first dwell speed plus the resonance range speed.

9. The method of claim 4, wherein the determining step includes the step of determining a second dwell speed in the presence of a falling speed gradient, and setting the second dwell speed for a predefinable time period, which results from the actual speed plus a predefined delta speed.

10. The method of claim 9, further comprising the step of determining, after elapse of the time period, whether a target speed is lower than the second dwell speed plus a predefined resonance range speed.

11. The method of claim 10, further comprising the step of continuing the spin operation at least for a while at this target speed, until the spin operation can be brought to an end without further undesirably high vibration or until a further undesirably high vibration is detected before the end of the spin operation, if the target speed is lower.

12. The method of claim 10, further comprising the steps of maintaining the second dwell speed for a further predefinable time period, if the target speed is greater than the dwell speed minus the resonance range speed, and checking, after elapse of the further time period, whether the target speed is lower than the second dwell speed minus the resonance range speed.

13. The method of claim 1, further comprising the step of changing the spin speed with such a gradient so that a frequency band of a resonance range of the vibrations is passed through in a short time.

14. The method of claim 1, wherein the household appliance is installed on a wooden floor as its base.

15. The method according to claim 1, wherein the reference values and/or the parameter values characterize the vibrations in terms of frequency and/or amplitude.

16. The method according to claim 1, wherein rising is defined as a change in a vector of speed as being greater than or equal to zero, and where falling is defined as a change in the vector of speed as being less than zero.

17. A method for minimizing vibrations during a spin cycle of a household appliance installed on a base, said method comprising the steps of:
    detecting a first change in a speed of the spin cycle of a drum;
    determining whether the change in speed is an acceleration or a deceleration of the spin cycle of the drum;
    detecting vibrations in the drum during the change in speed of the spin cycle;
    comparing detected vibrations with reference values that are specific to the base material upon which the appliance is installed; and
    altering the speed of the spin cycle as a function of a deviation of detected vibrations from the reference values and a determination of whether the first change in speed is an acceleration or a deceleration,
    wherein the alterations of the speed of the spin cycle is according to a first process if the first change in speed is a deceleration and a second process if the first change in speed is an acceleration.

18. The method of claim 17, wherein altering the speed of the spin cycle includes a temporary change to the speed of the spin cycle to a dwell speed during which vibrations are re-evaluated and further changes to the speed of the spin cycle are made based upon the re-evaluation of vibrations during the temporary change to the speed, the temporary change being a dwell time.

* * * * *